United States Patent

Ohashi et al.

Patent Number: 5,223,170
Date of Patent: Jun. 29, 1993

[54] FIBER TREATING COMPOSITIONS

[75] Inventors: Hiroshi Ohashi; Yasuaki Hara, both of Annaka; Toshinobu Ishihara; Tohru Kubota, both of Jouetsu, all of Japan

[73] Assignee: Shin-Etsu Chemical Co., Ltd., Tokyo, Japan

[21] Appl. No.: 738,361

[22] Filed: Jul. 31, 1991

[30] Foreign Application Priority Data

Aug. 1, 1990 [JP] Japan .................... 2-204384

[51] Int. Cl.$^5$ .......................... C11D 17/00
[52] U.S. Cl. .................. 252/174.15; 252/8.8
[58] Field of Search ................ 252/8.8, 174.15

[56] References Cited

U.S. PATENT DOCUMENTS 4,433,007  2/1984  Marwitz et al. .................... 427/54.1

Primary Examiner—Olik Chaudhuri
Assistant Examiner—C. Everhart
Attorney, Agent, or Firm—Millen, White, Zelano & Branigan

[57] ABSTRACT

A fiber treating composition based on an organopolysiloxane of the average compositional formula:

$$R^1_x R^2_y SiO_{(4-x-y)/2} \qquad (1)$$

wherein $R^1$ is an organic group having a nitrogen atom, $R^2$ is a substituted or unsubstituted monovalent hydrocarbon group having 1 to 20 carbon atoms or a group represented by $-OR^3$ wherein $R^3$ is a hydrogen atom or a substituted or unsubstituted monovalent hydrocarbon group having 1 to 8 carbon atoms, and letters x and y are $0<x<3$, $0<y<3$, and $1.8 \leq x+y \leq 2.2$, at least 10 mol% of the $R^1$ group being a group represented by the formula:

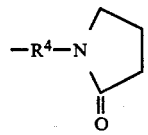

wherein $R^4$ is a divalent hydrocarbon group having 1 to 8 carbon atoms meets all the requirements of softness, hydrophilic property, and anti-yellowing at the same time in treating fibers and fabrics.

4 Claims, No Drawings

FIBER TREATING COMPOSITIONS

This invention relates to a fiber treating composition capable of imparting softness and hydrophilic property to fibers without yellowing.

BACKGROUND OF THE INVENTION

For imparting softness and smoothness to fibers, wax, oils or fats such as fatty acids and quaternary ammonium salts containing long chain alkyl groups were widely used in the past. Certain organopolysiloxanes are also known as fiber treating agents. For the purposes of improving water repellency, softness, smoothness, resiliency, and the like, there were proposed dimethylpolysiloxanes, epoxy-containing polysiloxanes and amino-containing polysiloxanes (see Japanese Patent Publication Nos. 1480/1973 and 43617/1979).

Fats, oils and quaternary ammonium salts fail to provide satisfactory softness. Dimethylpolysiloxanes can impart smoothness, but are less satisfactory in softness. Epoxy-containing polysiloxanes can impart fairly good smoothness and softness, but to a less extent than can amino-containing polysiloxanes.

The amino-containing polysiloxanes can impart fully satisfactory softness and smoothness to fabrics, but suffer from a tarnish phenomenon. Oxidation of amino groups can occur under the influence of UV radiation or the like during heat treatment involved in the fiber treatment process or storage of treated fabrics, giving rise to discoloration and especially, yellowing in the case of white or light color fabrics.

For the purpose of overcoming the yellowing problem, a variety of proposals have been made, for example, amidization of amino groups with acid anhydrides or acid chlorides (Japanese Patent Application Kokai No. 101076/1982) and blocking of active hydrogen of amino groups with epoxy compounds (Japanese Patent Publication No. 44073/1987). These methods achieve some improvement in yellowing as compared with the use of amino-containing polysiloxanes, but to a still unsatisfactory extent. Another drawback of these methods is a loss of softness.

Moreover, the treatment with amino-containing polysiloxanes renders fabrics water repellent. Natural fiber fabrics which are hydrophilic by nature would undesirably lose their own property when treated therewith.

For imparting hydrophilic nature to fibers, it is known to treat fibers with polyether group-containing siloxanes. However, this treatment provides noticeably inferior softness as compared with the use of amino-containing polysiloxanes.

There is a need for a fiber treating composition providing a good compromise among softness, hydrophilic property and anti-yellowing.

SUMMARY OF THE INVENTION

An object of the present invention is to provide a new and improved fiber treating composition which can impart softness and hydrophilic property to fibers while preventing the fibers from yellowing.

The inventors have found that this and other objects are achieved by treating fibers with an organopolysiloxane having a 2-oxypyrrolidinoalkyl group as a nitrogeneous organic group in its molecule.

According to the present invention, there is provided a fiber treating composition comprising as an active agent an organopolysiloxane of average compositional formula (1).

$$R_x^1 R_y^2 SiO_{(4-x-y)/2} \quad (1)$$

In formula (1), $R^1$ is an organic group having a nitrogen atom, $R^2$ is a substituted or unsubstituted monovalent hydrocarbon group having 1 to 20 carbon atoms or a group represented by $-OR^3$ wherein $R^3$ is a hydrogen atom or a substituted or unsubstituted monovalent hydrocarbon group having 1 to 8 carbon atoms. Letters x and y are $0<x<3$, $0<y<3$, and $1.8 \leq x+y \leq 2.2$. At least 10 mol % of the $R^1$ group is a group represented by the formula:

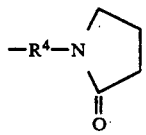

wherein $R^4$ is a divalent hydrocarbon group having 1 to 8 carbon atoms. When treated with this composition, fabrics possess improved softness, hydrophilic property, and smoothness and are little affected by heat and UV radiation during the process or subsequent storage. That is, the yellowing problem of treated fabric is overcome.

DESCRIPTION OF THE PREFERRED EMBODIMENTS

The fiber treating composition of the present invention is defined as comprising as an active agent an organopolysiloxane of average compositional formula (1):

$$R_x^1 R_y^2 SiO_{(4-x-y)/2} \quad (1)$$

wherein $R^1$ is an organic group having a nitrogen atom, $R^2$ is a substituted or unsubstituted monovalent hydrocarbon group having 1 to 20 carbon atoms or a group represented by $-OR^3$ wherein $R^3$ is a hydrogen atom or a substituted or unsubstituted monovalent hydrocarbon group having 1 to 8 carbon atoms. Letters x and y are $0<x<3$, $0<y<3$, and $1.8 \leq x+y \leq 2.2$.

The nitrogeneous organic group represented by $R^1$ is not particularly limited, but 10 to 100 mol %, preferably 25 to 100 mol % of the $R^1$ group should be a 2-oxypyrrolidinoalkyl group represented by the formula.

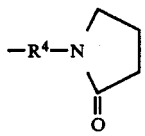

If the 2-oxyprrolidinoalkyl group is less than 10 mol % of $R^1$, the object of the invention to meet all the requirements of softness, hydrophilic property and anti-yellowing is not achievable. $R^4$ is a divalent hydrocarbon group having 1 to 8 carbon atoms, for example, alkylene, cycloalkylene, arylene, and alkenylene groups having 1 to 8 carbon atoms.

The group represented by $R^1$ other than the 2-oxypyrrolidinoalkyl group may be selected from various nitrogeneous groups, preferably aminoalkyl groups having the formula:

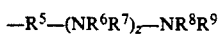

wherein $R^5$ and $R^7$ are divalent hydrocarbon groups having 1 to 8 carbon atoms as defined for $R^4$; $R^6$, $R^8$, and $R^9$ each are a hydrogen atom or a substituted or unsubstituted monovalent hydrocarbon group having 1 to 8 carbon atoms, and z is a positive integer of from 0 to 4. Examples of the aminoalkyl group are given below.

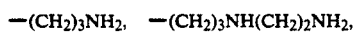

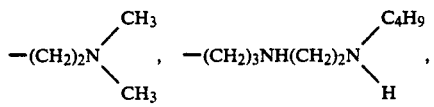

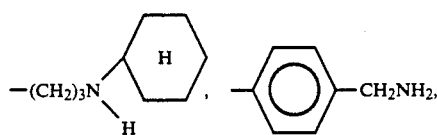

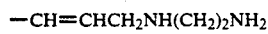

In formula (1), $R^2$ is a substituted or unsubstituted monovalent hydrocarbon group having 1 to 20 carbon atoms, preferably 1 to 12 carbon atoms. Examples of the monovalent $C_{1-20}$ hydrocarbon group for $R^2$ include alkyl groups such as methyl, ethyl, butyl, dodecyl, and octadecyl; alkenyl groups such as vinyl and allyl; cycloalkyl groups such as cyclohexyl and cycloheptyl; aryl groups such as phenyl and naphthyl; and substituted one of these groups in which some or all of the hydrogen atoms are replaced by halogen atoms, cyano group or the like, such as chloromethyl and 3,3,3-trifluoropropyl groups. Alternatively, $R^2$ is a group represented by $-OR^3$ wherein $R^3$ is a hydrogen atom or a substituted or unsubstituted monovalent hydrocarbon group having 1 to 8 carbon atoms, preferably 1 to 4 carbon atoms. Examples of $C_{1-8}$ hydrocarbon group of $R^3$ are the same groups as mentioned above for $R^2$, but having 1 to 8 carbon atoms. Therefore, exemplary groups represented by $-OR^3$ are hydroxyl, alkoxy, alkenyloxy, aryloxy, and acyloxy groups.

Several non-limiting examples of the organopolysiloxane of formula (1) are given below.

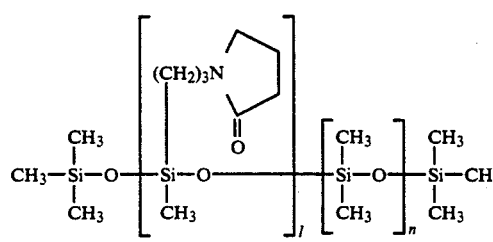

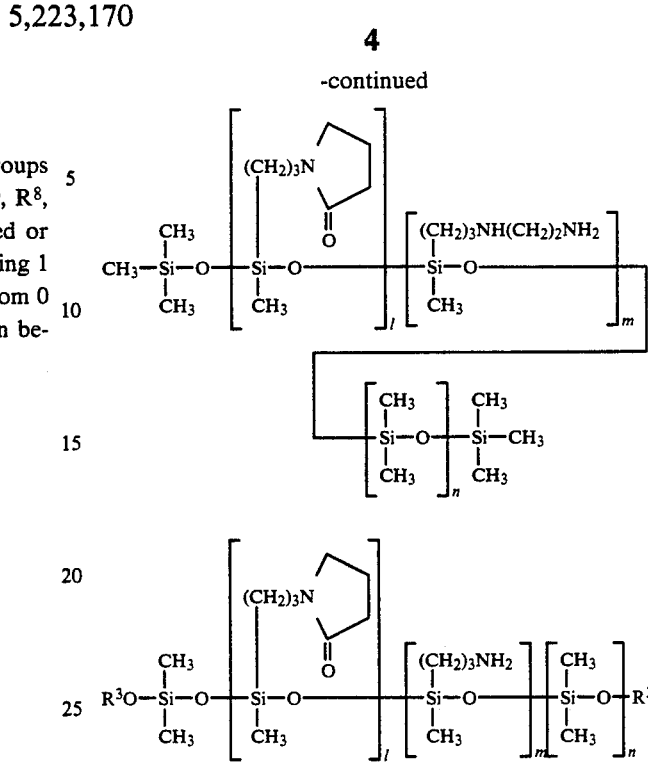

In the formulae, l and n are positive integers, and m is 0 or a positive integer. Preferably, l is 1 to 100, m is 0 to 100, and n is 50 to 10,000. In addition to the above structures, branched structures are also contemplated.

The organopolysiloxanes having a 2-oxypyrrolidinoalkyl group may be manufactured, for example, by effecting equilibration reaction among a hydrolyzed condensate of a silane compound represented by the formula:

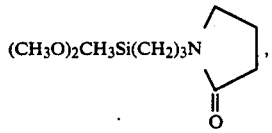

a cyclic siloxane such as octamethylcyclotetrasiloxane, and hexadimethylsiloxane in the presence of an alkaline catalyst such as potassium hydroxide, sodium hydroxide, lithium hydroxide, and tetrabutylammonium hydroxide at a temperature of 100° to 150° C. for about 4 to 8 hours. Thereafter, the alkaline catalyst is neutralized with an acidic substance such as ethylene chlorohydrin, hydrochloric acid, sulfuric acid, and acetic acid. If desired, a low boiling fraction is removed by heating in vacuum.

In order to introduce a silanol group instead of the trimethylsilyl group as a siloxane terminal group, water may be used instead of the hexamethyldisiloxane. Also, an alkoxy group may be introduced as a terminal group by using

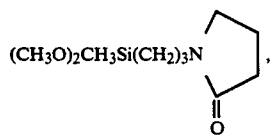

or an alkoxysilane such as dimethyldimethoxysilane and dimethyldiethoxysilane.

The fiber treating composition of the present invention is predominantly composed of an organopolysiloxane having formula (1) while there may be added any other agents commonly used for fiber treatment, for example, water repellent agents, anti-crease agent, flame retardants, and anti-static agents.

Various fabrics are treated with the composition of the present invention, for example, by diluting the compositions with an appropriate solvent to a desired concentration or by dispersing the composition in water with the aid of a surfactant to form an emulsion, diluting the emulsion with water to a desired concentration, then causing the organopolysiloxane of formula (1) to adhere to fibers by suitable application means such as dipping, roll coating, and spraying, and finally drying the fibers. The amount of the organopolysiloxane adhered to the fabric is not particularly limited although about 0.1 to about 5% by weight of the fabric is generally satisfactory. The surfactants used in forming emulsions include anonic surfactants such as sodium alkyl sulfates and sodium alkyl benzene sulfonate; nonionic surfactants such as polyoxyethylene alkyl phenyl ether and polyoxyethylene alkyl ether; and cationic surfactants such as quaternary ammonium salts.

A method generally known as emulsion polymerization may be used as the means for forming an emulsion. For example, octamethylcyclotetrasiloxane and a silane compound represented by the formula;

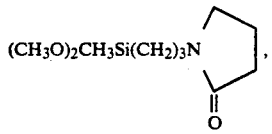

or a hydrolyzed condensate thereof are dispersed and emulsified in water with the aid of a cationic surfactant. After an alkaline catalyst as previously mentioned is added to the emulsion, polymerization reaction is conducted at 50° to 90° C. for about 24 to 72 hours. Neutralization with an acidic substance as previously mentioned will yield an emulsion of the (emulsion polymerized) end organopolysiloxane. This emulsion is also ready for fiber treatment.

A variety of fibers and fabrics can be treated with the composition of the present invention. This invention is applicable to all commonly used types of fibers and fabrics including natural fibers and fabrics thereof such as cotton, linen, silk, and wool and synthetic fibers and fabrics thereof such as polyester, nylon and acryl.

There has been described a fiber treating composition which can treat fibers and fabrics to impart softness and hydrophilic nature thereto without causing yellowing, thus meeting all the requirements of softness, hydrophilic property, and anti-yellowing.

EXAMPLE

Examples of the present invention are given below together with comparative examples by way of illustration and not by way of limitation.

EXAMPLE 1

A 2-liter flask equipped with a stirrer, thermometer, and reflux condenser was charged with 47.1 grams of a siloxane resulting from hydrolysis of 2-oxypyrrolidinopropylmethyldimethoxysilane of the formula:

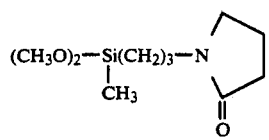

933 grams of octamethylcyclotetrasiloxane, 19.8 grams of decamethyltetrasiloxane, and 0.15 grams of KOH catalyst. With stirring, reaction was effected at 140° C. for 6 hours. Then the reaction solution was cooled to 100° C., 0.65 grams of ethylene chlorohydrin was added, and the reaction solution was allowed to stand at 100° C. for 2 hours to neutralize the catalyst. The reaction product was kept at 140° C. under a vacuum of 10 mm Hg for 2 hours to remove a low boiling fraction, yielding an oily product having a viscosity of 320 centistokes and 98.9% of a residue as volatilized at 150° C. for 30 minutes. On IR and NMR analysis, the oil was identified to be an organopolysiloxane having a 2-oxypyrrolidinoalkyl group as represented by the average compositional formula:

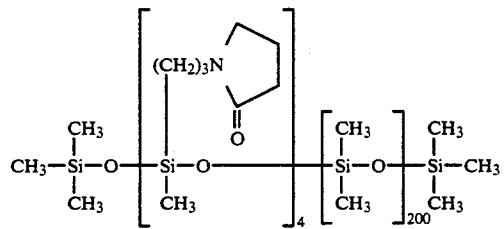

EXAMPLE 2

Synthesis was done by the same procedure as in Example 1 except that 871.5 grams of octamethylcyclotetrasiloxane, 110.0 grams of a hydrolysate of 2-oxypyrrolidinopropylmethyldimethoxysilane, and 18.5 grams of decamethyltetrasiloxane were used. There yielded an oily product having a viscosity of 850 centistokes and 98.5% of a volatilization residue. On analysis, the oil was identified to be an organopolysiloxane having the average compositional formula:

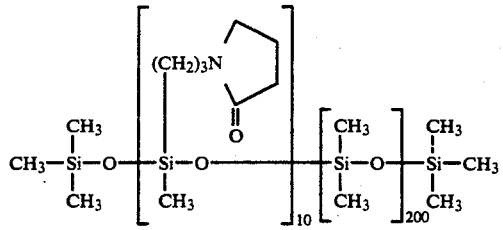

EXAMPLE 3

Synthesis was done by the same procedure as in Example 1 except that 951.8 grams of octamethylcyclotetrasiloxane, 45.2 grams of a hydrolysate of 2-oxypyrrolidinopropylmethyldimethoxysilane, and 3.0 grams of 2-oxypyrrolidonopropylmethyldimethoxysilane were used. There yielded an oily product having a viscosity of 35,700 centistokes and 97.2% of a volatilization residue. On analysis, the oil was identified to be an organopolysiloxane having the average compositional formula:

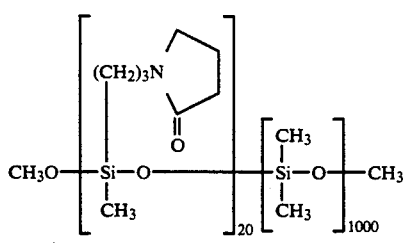

COMPARATIVE EXAMPLE 1

Synthesis was done by the same procedure as in Example 1 except that 949.1 grams of octamethylcyclotetrasiloxane, 30.8 grams of aminopropylmethylcyclotetrasiloxane of the formula:

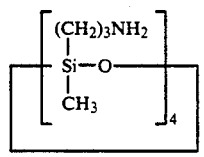

and 20.1 grams of decamethyltetrasiloxane were used. There yielded an oily product having a viscosity of 380 centistokes and 98.5% of a volatilization residue. On analysis, the oil was identified to be an organopolysiloxane having the average compositional formula:

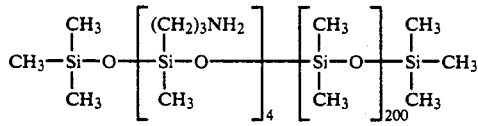

EXAMPLE 4

Synthesis was done by the same procedure as in Example 1 except that 945.1 grams of octamethylcyclotetrasiloxane, 11.9 grams of a hydrolysate of 2-oxypyrrolidinopropylmethyldimethoxysilane, 23.0 grams of aminopropylmethylcyclotetrasiloxane, and 20.0 grams of decamethyltetrasiloxane were used. There yielded an oily product having a viscosity of 370 centistokes and 98.6% of a volatilization residue. On analysis, the oil was identified to be an organopolysiloxane having the average compositional formula:

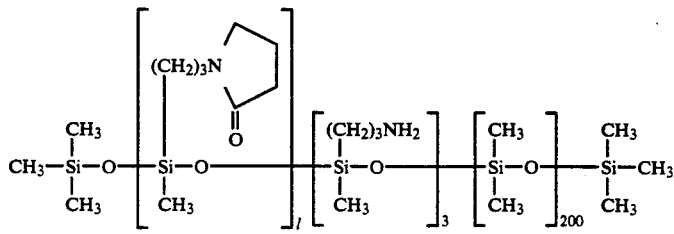

The following test used additional comparative samples.

COMPARATIVE EXAMPLE 2

Dimethylpolysiloxane having a viscosity of 350 centistokes.

COMPARATIVE EXAMPLE 3

A polysiloxane containing a polyether group as represented by the average compositional formula:

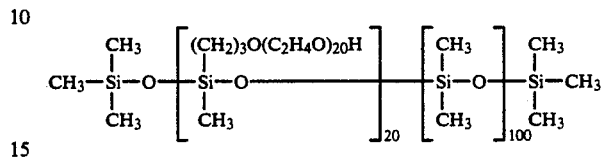

TEST 300 grams of each of the siloxanes obtained in Examples 1–4 and Comparative Example 1 and dimethylpolysiloxane (Comparative Example 2) was dispersed in 670 grams of water along with 30 grams of polyoxyethylene nonyl phenyl ether to form an emulsion. Also, the polyether group-containing polysiloxane (Comparative Example 3) was dissolved in water to a concentration of 0.3% by weight.

Each of the emulsions was diluted with water to a concentration of 1% by weight of the active ingredient. Pieces of fluorescent dyed cotton broadcloth were dipped in the diluted emulsion, squeezed through rolls at a squeeze rate of 100%, heated at 100° C. for 2 minutes and then at 150° C. for 2 minutes. The treated cloth pieces were examined for softness by finger feel. The pieces were further heated at 200° C. for 5 minutes to examine yellowing. Hydrophilic property was examined by placing a 20-μl droplet of water on the treated cloth pieces through a measuring pipette and measuring the time until the droplet had penetrated. The results are shown in Table 1.

Softness was evaluated according to the following criterion. ○(Good): very soft, pleasant feel Δ(Fair): somewhat rough, internally hard feel ×(Reject): rough, hard, rugged feel Yellowness was evaluated by measuring b value in accordance with the CIE L*a*b* color space by means of a color difference meter Model 1001DP manufactured by Nihon Denshoku Kogyo K.K. Positive b values of high magnitude indicate more yellowness and negative b values of high magnitude indicate less yellowness, that is, blue (−)←b value→(+) yellow.

TABLE 1

| | | | b value | |
|---|---|---|---|---|
| | | | After heating | |
| | Softness | Hydrophilic | After treatment | @200° C., 5 min. |
| Example 1 | ○ | 40 sec. | −4.1 | −3.5 |

TABLE 1-continued

| | Softness | Hydro-philic | b value After treatment | b value After heating @200° C., 5 min. |
|---|---|---|---|---|
| Example 2 | ○ | 35 sec. | −4.0 | −3.2 |
| Example 3 | ○ | 60 sec. | −4.0 | −3.5 |
| Example 4 | ○ | 55 sec. | −3.9 | −2.6 |
| Comparative Example 1 | ○ | 300 sec.* | −3.5 | +0.9 |
| Comparative Example 2 | Δ | 300 sec.* | −4.1 | −3.6 |
| Comparative Example 3 | Δ | 0 | −4.0 | −3.3 |
| Control | X | 0 | −4.2 | −3.5 |

Measurement was stopped at 300 second. Control is a non-treated cloth sample.

As seen from Table 1, a fiber treating composition composed mainly of a 2-oxypyrrolidinoalkyl-containing organopolysiloxane can meet at the same time all the requirements of softness, hydrophilic property, and anti-yellowing which were believed incompatible in the prior art.

Although some preferred embodiments have been described, many modifications and variations may be made thereto in the light of the above teachings. It is therefore to be understood that within the scope of the appended claims, the invention may be practiced otherwise than as specifically described.

We claim:

1. A fiber treating composition consisting essentially of an organopolysiloxane of the average compositional formula:

$$R_x^1 R_y^2 SiO_{(4-x-y)/2} \quad (1)$$

wherein $R^1$ is an organic group having a nitrogen atom, $R^2$ is a substituted or unsubstituted monovalent hydrocarbon group having 1 to 20 carbon atoms or a group represented by —$OR^3$ wherein $R^3$ is a hydrogen atom or a substituted or unsubstituted monovalent hydrocarbon group having 1 to 8 carbon atoms, and letters x and y are $0<x<3$, $0<y<3$, and $1.8 \leq x+y \leq 2.2$, at least 10 mol % of the $R^1$ group being a group represented by the formula:

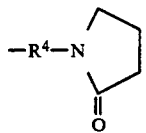

wherein $R^4$ is a divalent hydrocarbon group having 1 to 8 carbon atoms.

2. The fiber treating composition of claim 1 wherein $R^1$ consists of a 2-oxypyrrolidinoalkyl group represented by the formula:

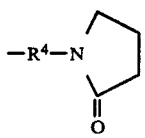

wherein $R^4$ is divalent hydrocarbon group having 1 to 8 carbon atoms, and an aminoalkyl group represented by the formula:

$$-R^5-(NR^6R^7)_z-NR^8R^9$$

wherein $R^5$ and $R^7$ each are a divalent hydrocarbon group having 1 to 8 carbon atoms and $R^6$, $R^8$ and $R^9$ each are a hydrogen atom or a substituted or unsubstituted monovalent hydrocarbon group having 1 to 8 carbon atoms, and z is a positive integer of from 0 to 4, said 2-oxypyrrolidinoalkyl group being present in an amount of at least 10 mol % of the $R^1$ group.

3. A method of treating fibers to impart softness and hydrophilic property to the fibers without yellowing, comprising:

causing a fiber treating composition consisting essentially of an organopolysiloxane to adhere to the fibers in an amount about 0.1 to about 5% by weight of the fibers, said organopolysiloxane having the average compositional formula:

$$R_x^1 R_y^2 SiO_{(4-x-y)/2} \quad (1)$$

wherein $R^1$ is an organic group having a nitrogen atom, $R^2$ is a substituted or unsubstituted monovalent hydrocarbon group having 1 to 20 carbon atoms or a group represented by —$OR^3$, where $R^3$ is a hydrogen atom or a substituted or unsubstituted monovalent hydrocarbon group having 1 to 8 carbon atoms, and letters x and y are $0<x<3$, $0<y<3$, and $1.8 \leq x+y \leq 2.2$, at least 10 mol % of the $R^1$ group being a group represented by the formula:

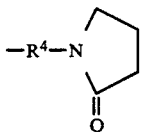

wherein $R^4$ is a divalent hydrocarbon group having 1 to 8 carbon atoms.

4. The method of claim 3 wherein $R^1$ consists of a 2-oxypyrrolidinoalkyl group represented by the formula:

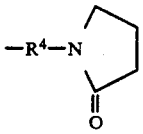

wherein $R^4$ is divalent hydrocarbon group having 1 to 8 carbon atoms, and an aminoalkyl group represented by the formula:

$$-R^5-(NR^6R^7)_z-NR^8R^9$$

wherein $R^5$ and $R^7$ each are a divalent hydrocarbon group having 1 to 8 carbon atoms and $R^6$, $R^8$ and $R^9$ each are a hydrogen atom or a substituted or unsubstituted monovalent hydrocarbon group having 1 to 8 carbon atoms, and z is a positive integer of from 0 to 4, said 2-oxypyrrolidinoalkyl group being present in an amount of at least 10 mol % of the $R^1$ group.

* * * * *